United States Patent [19]

Bishop et al.

[11] Patent Number: 4,505,194
[45] Date of Patent: Mar. 19, 1985

[54] AUTOMATIC FOOD FRYING AND DISPENSING APPARATUS

[76] Inventors: Charles D. Bishop, 7729 Blossom La., Dallas, Tex. 75227; Joe R. Powell, 4617 Cliffwood, Garland, Tex. 75043; Kenneth H. Stamps, 1825 Glouchester, Garland, Tex. 75050; Clifford A. Watson, 2822 Glenbrook, Garland, Tex. 75041

[21] Appl. No.: 530,013

[22] Filed: Sep. 9, 1983

[51] Int. Cl.³ .............................................. A47J 37/12
[52] U.S. Cl. ...................................... 99/336; 55/279; 55/DIG. 36; 98/115.1; 99/337; 99/344; 99/356; 99/407
[58] Field of Search ................. 98/115 R; 126/299 D, 126/299 F, 300, 388; 55/279, DIG. 36; 99/336, 337, 342, 343, 344, 356, 403, 407, 408, 444; 169/65

[56] References Cited

U.S. PATENT DOCUMENTS

| | | |
|---|---|---|
| 1,720,830 | 7/1929 | Gallowitz ............................ 99/343 |
| 2,219,949 | 10/1940 | Childs ............................ 99/408 X |
| 2,337,481 | 12/1943 | Lowe ............................ 99/408 |
| 2,712,295 | 7/1955 | Haynes ............................ 126/388 X |
| 2,748,243 | 5/1956 | Michaelis ............................ 99/403 |
| 3,213,778 | 10/1965 | Martino ............................ 99/342 X |
| 3,391,689 | 7/1968 | Roger ............................ 55/DIG. 36 |
| 3,448,677 | 6/1969 | Dexters ............................ 99/407 X |
| 3,463,077 | 8/1969 | Lescure ............................ 99/408 |
| 3,667,373 | 6/1972 | Sicher ............................ 99/407 |
| 3,685,432 | 8/1972 | Hoeberigs ............................ 99/407 X |
| 3,785,124 | 1/1974 | Gaylord ............................ 55/DIG. 36 |
| 3,818,820 | 6/1974 | Harris ............................ 99/336 X |
| 3,869,972 | 3/1975 | Chase ............................ 99/408 X |
| 3,971,307 | 7/1976 | Graham ............................ 99/403 |
| 3,981,232 | 9/1976 | Williamson ............................ 99/408 X |
| 4,356,870 | 11/1982 | Gaylord ............................ 169/65 |

FOREIGN PATENT DOCUMENTS 2303448 10/1976 France .................................. 99/403
473144 10/1937 United Kingdom .................. 55/279

Primary Examiner—Billy J. Wilhite
Attorney, Agent, or Firm—Kanz, Scherback & Timmons

[57] ABSTRACT

Automatic food frying and dispensing apparatus is disclosed which is housed in a supporting cabinet and includes a device for holding a supply of cooking oil and a heating device for maintaining the temperature of the cooking oil at a predetermined temperature. A fan assembly exhausts air through the top of the cabinet. A derated precipitator, a flame arrester and a charcoal filter are positioned upstream of the fan assembly and in the path of air flow. A switch device is positioned in the path of air flow and shuts off the heating device if the air flow drops below a predetermined value. Food handling apparatus automatically lowers the food to be cooked into the cooking oil when a customer selects a desired cooking time and automatically raises the food from the cooking oil and dumps the food into a container positioned at the food collection station at the end of the preselected cooking time.

20 Claims, 18 Drawing Figures

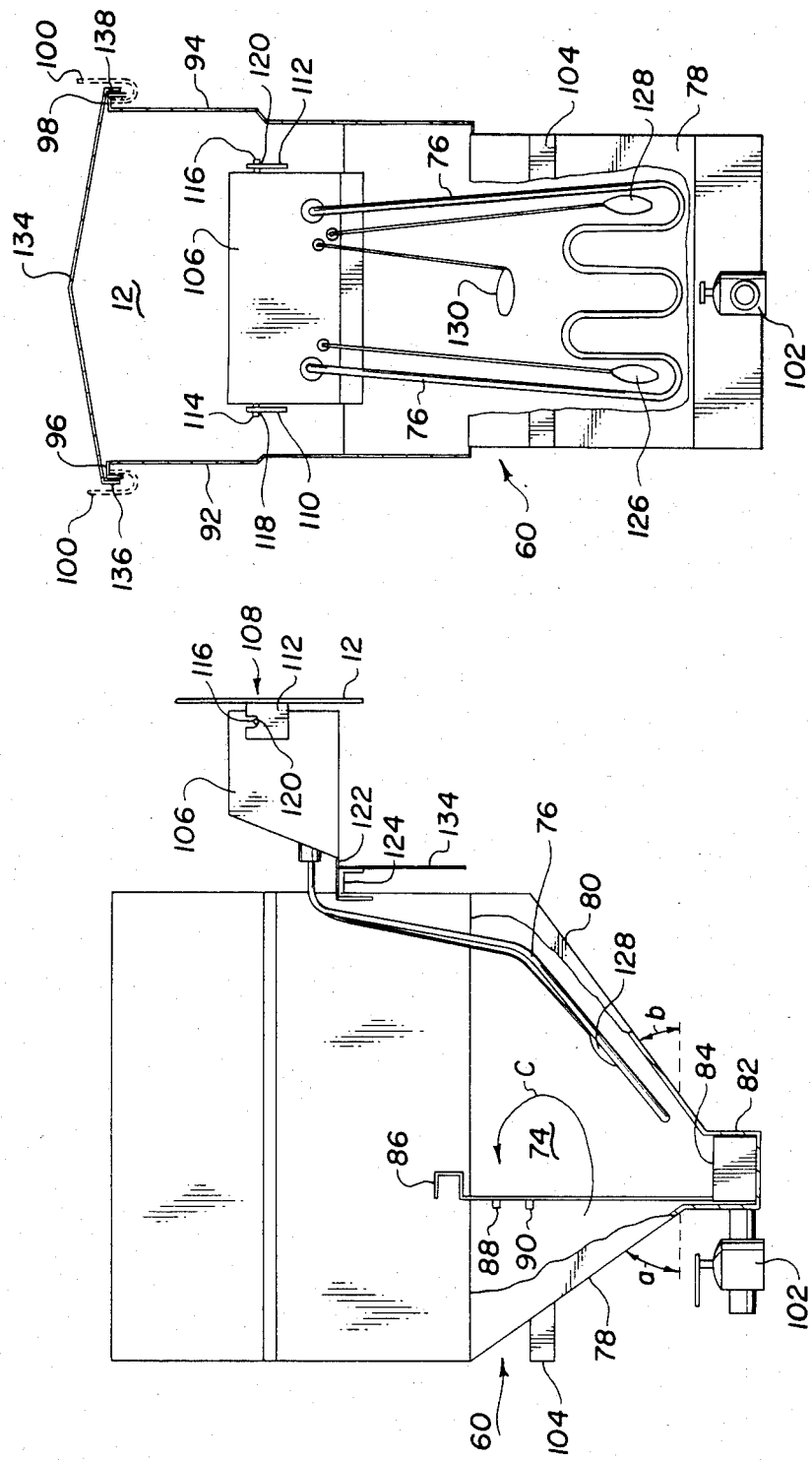

AUTOMATIC FOOD FRYING AND DISPENSING APPARATUS

BACKGROUND OF THE INVENTION

1. Field of the Invention

The present invention relates in general to food preparation. More particularly, this invention relates to apparatus for the deep-fat frying of food, and specifically is directed to automatic, deep-fat frying and dispensing apparatus for the frying of food in a consumer environment by the customer/consumer or attendant without risk of food contamination by human contact or without risk of contact with the hot cooking oil by the customer while essentially eliminating the introduction of smoke and/or odor into the surrounding environment.

Although the present invention is applicable for deep-fat frying of numerous types of food products, it has been found to be particularly useful in the frying of frozen french-fry cut potato pieces by customers or attendants. Therefore, without limiting the applicability of the invention to "frying of frozen french-fry cut potato pieces", the invention will be described in this environment.

Deep-fat fryers or french fryers are widely used in the restaurant business for cooking various food products such as french-fried potatoes, fish and chicken. Typically, such french fryers comprise a deep tank containing a pool of cooking oil in the lower part of the tank with the cooking oil being heated by an immersed electric heating element or by a gas flame. The uncooked food product is placed in a basket which is lowered into the heated oil for the desired cooking period. When the product is done, as determined by visual inspection by the restaurant employee or the sound of an audio timer, the basket should be removed from the oil by the employee and the product served to a customer or transferred to a holding station where it is is kept warm by heat lamps until served. This process requires the use of and occupies the time of the restaurant employee/operator. Also the food product is not always freshly fried under these conditions since the potatoes are cooked in large quantities which may not be used immediately and tend to cool down before being consumed. In the present inventive machine, the potatoes are cooked in small individual quantities, when a customer desires or orders it, by using an extremely short cooking cycle of less than 200 seconds. This short cycle is possible because the food product is precooked to a predetermined degree.

With the advent of consumer demand for freshly cooked, prepared on-site hot foods, the need for apparatus to provide hot food products such as french-fried potatoes, fish and chicken has increased. Since in this environment the cooking apparatus is normally operated by the limited manpower of consumer/attendant, the apparatus must be of the type which is easily and safely operated. The apparatus must also be reasonable in cost, be reliable in its operation and not pollute the surrounding environment without it being necessary to vent the cooking fumes to an area outside of the operating location.

2. Description of the Prior Art

In the prior art, various machines are known for processing and dispensing small batches or individual servings of a food product, such as french-fried potatoes. While a few of the machines have achieved some small degree of commercial acceptance, many others have not been successful.

U.S. Pat. No. 3,448,677 discloses an automated machine for selling fried foods which is coin operated. Upon depositing the correct coinage, a screw conveyor rotates to discharge food to be fried from a storage hopper onto a tray. The tray is balanced to tilt when it receives the proper weight of food with the tilting causing the screw conveyor to stop feeding food. When the tray tilts, it discharges the food into a basket immersed in hot cooking oil and also starts a timer running. When the time has run, a motor starts and through belts, pulleys, shafts, etc., dispenses a container for the food and then tilts the basket to discharge the fried food into the container.

U.S. Pat. No. 3,667,373 discloses an automated coin-operated fried potato machine containing a removable multiple bin supply tray to hold a predetermined quantity of potatoes in each bin and a mechanism to feed the potatoes from successive bins to a hopper which empties into a basket positioned within a cooking bowl. The cooking bowl is pivotally mounted above a storage vessel containing hot cooking oil. An oil lift assembly supplies oil from the storage vessel to the cooking bowl for each batch of potatoes and after the potatoes are fried, the basket is pivoted to dump the fried potatoes into a serving tray fed from a supply stack. The cooking bowl is pivoted to dump the oil through a removable and replaceable filter member and into the storage vessel.

U.S. Pat. No. 3,685,432 discloses an automatic coin-operated machine for cooking and dispensing fried foods which are stored within the machine in a conveyor. The conveyor contains holders for separate portions of food and dumps same into a supply funnel with multiple compartments, each of which is closed by a separately-operated flap. From the funnel, the food is guided into a basket immersed in a vat of cooking oil. After a predetermined time, the basket is pivoted to drop the fried food into a serving container which is automatically fed from a supply stack.

U.S. Pat. No. 3,818,820 discloses an automatic machine for preparing fried potato products which contains a food hopper for storing the potatoes to be fried. A slidably mounted ejection scoop at the bottom of the food hopper dispenses the right amount of potatoes into a basket immersed into a vat of cooking oil. At the end of a predetermined time, the basket is pivoted to drop the fried potatoes into a waiting container. The machine also contains a fan to extract the fumes via a replaceable charcoal filter unit. An automatic fire extinguisher unit is mounted near the fume outlet to extinguish the oil if it should catch fire.

The present invention as claimed is intended to provide a solution to various prior art deficiencies including the reliability problems associated with the complex automated mechanisms. Also, the high initial cost of the automated mechanisms as well as the high cost of daily operation and maintenance is considered a deficiency. In addition, the unacceptable service requirements associated with the highly automated mechanisms is considered a problem. There is also the problem of air pollution by the odor and smoke emitted from some of the machines. Some machines also tend to allow small amounts of cooking oil to exit from the machine. Also, the relative large physical size of the automated units can limit the location of the mechanism as well as the need for an external exhaust. In some prior art devices which store the food, there is a risk of spoilage and contamination of the food. There is also the relatively long length of time before the customer receives the cooked food after depositing coins in the machine. There is also the tendency for some units to contaminate the cooking oil by allowing pieces of the fried food to remain therein, thereby requiring the frequent changing of the cooking oil. In some units, it is inconvenient and difficult to clean the parts in contact with the oil and oily foods because of the complex automated mechanisms. In addition, many machines are of a design which does not allow for fast and easy removal and replacement of parts and units.

SUMMARY OF THE INVENTION

The present invention provides an automatic food frying and dispensing apparatus which may be easily and safely operated. The apparatus is a relatively small unit for table top mounting without a requirement for an exhaust duct external to the room where the apparatus is located. Emphasis is placed upon modular-type construction of an uncomplicated nature which allows easy removal and replacement of parts or units with a minimum of time and effort along with a minimum amount of daily attention to machine operation by the owner. Automatic food frying and dispensing apparatus includes an upright cabinet which is generally L-shaped in side profile. A fan assembly is mounted in the uppermost portion of the cabinet while drawing air in from the bottom portion of the cabinet. A sail switch is mounted in the path of air flow to sense the presence of air flow and to remove power from the heating element for the cooking oil and the low voltage power supply if the air flow falls below a predetermined value. A derated precipitator and a filter module are positioned in the path of air flow upstream from the fan assembly to remove all odors, gases and smoke from the air in the cabinet before the air is exhausted therefrom. The filter module contains activated charcoal particles. The filter module is uniquely shaped to provide a greater surface area to the flow of air. A protection guard is provided on the front and bottom portions of the derated precipitator such that an operator or maintenance personnel cannot be shocked accidentally. A flame arrester is positioned between the derated precipitator and the filter module to prevent any flames from a fire in the lower portion of the cabinet from reaching the filter module or beyond.

A container for holding a supply of cooking oil is located in the bottom portion of the cabinet and is configured to operate with a minimum amount of oil with a resulting decrease in BTU's required to operate the apparatus. Means for maintaining the temperature of the cooking oil sufficiently high is removably attached to the cabinet. A fire extinguisher is automatically activated in case of fire in the apparatus. The fire extinguisher includes a shield on the output nozzle to concentrate the contents of the fire extinguisher downwardly to the container of cooking oil.

One or more individual and separate food handling apparatus are removably attached to a lower cabinet cover. Each food handling apparatus includes a cooking basket, a lid assembly which is movable by the user to allow the user to introduce the uncooked food into the cooking basket and a first funnel assembly and a chute assembly to guide the deposited food into the cooking basket while the cooking basket is immersed in the cooking oil. A motor, gearing and link and support assemblies lower and raise the cooking basket. Electronic circuitry controls the motor and thereby controls the amount of time the cooking basket and food are in the cooking oil. At a preselected time, the cooking basket is raised from the cooking oil to a position which dumps the cooked food into a second funnel assembly which guides the cooked food into a third funnel assembly positioned over a container to receive the cooked food.

In one embodiment, the automatic food frying and dispensing apparatus includes a coin box and changer connected to the electronic circuitry such that the automatic food frying and dispensing apparatus cannot be operated until the proper amount of money is deposited into the coin box and changer.

In addition to a fire extinguisher, which extinguishes any fire when activated by a fire and also shuts down or removes primary power to the apparatus 10 when activated, an over-temperature control also shuts down or removes primary power to the apparatus 10 when the cooking oil becomes hotter than a predetermined value.

Among the advantages offered by the present invention is the compactness, high reliability and safety features provided by the apparatus. The present invention allows the cooking to occur in an inside area without need for an external exhaust. The present invention facilitates deep-fat frying of food without contacting the food with human hands or exposing the individual to the hot cooking oil. The present invention requires a minimum amount of cooking oil to be maintained for the cooking process and lengthens the use thereof by greatly reducing any contamination of the oil by food particles, by any contaminated oil being returned to the container of oil and by adding a minimum amount of fresh oil each day. The present invention allows the simultaneous cooking of one or more separate batches of food which are started, timed and controlled independently. The present invention provides food handling and dispensing apparatus which may be disassembed, without use of tools, for easy cleaning and replacement. The present invention also provides apparatus which is totally user operated. Warning systems in the present invention give indications to the user of low oil temperature and low oil level. Another advantage of the present invention is the low cost of daily operation of the apparatus.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements, in which:

BRIEF DESCRIPTION OF THE DRAWING

FIG. 9 is a simplified side elevational view of the cooking oil container and the heater assembly of the present invention;

FIG. 10 is a simplified front elevational view of the cooking oil container and the heater assembly of the present invention;

DESCRIPTION OF THE PREFERRED EMBODIMENT

Figure 1:
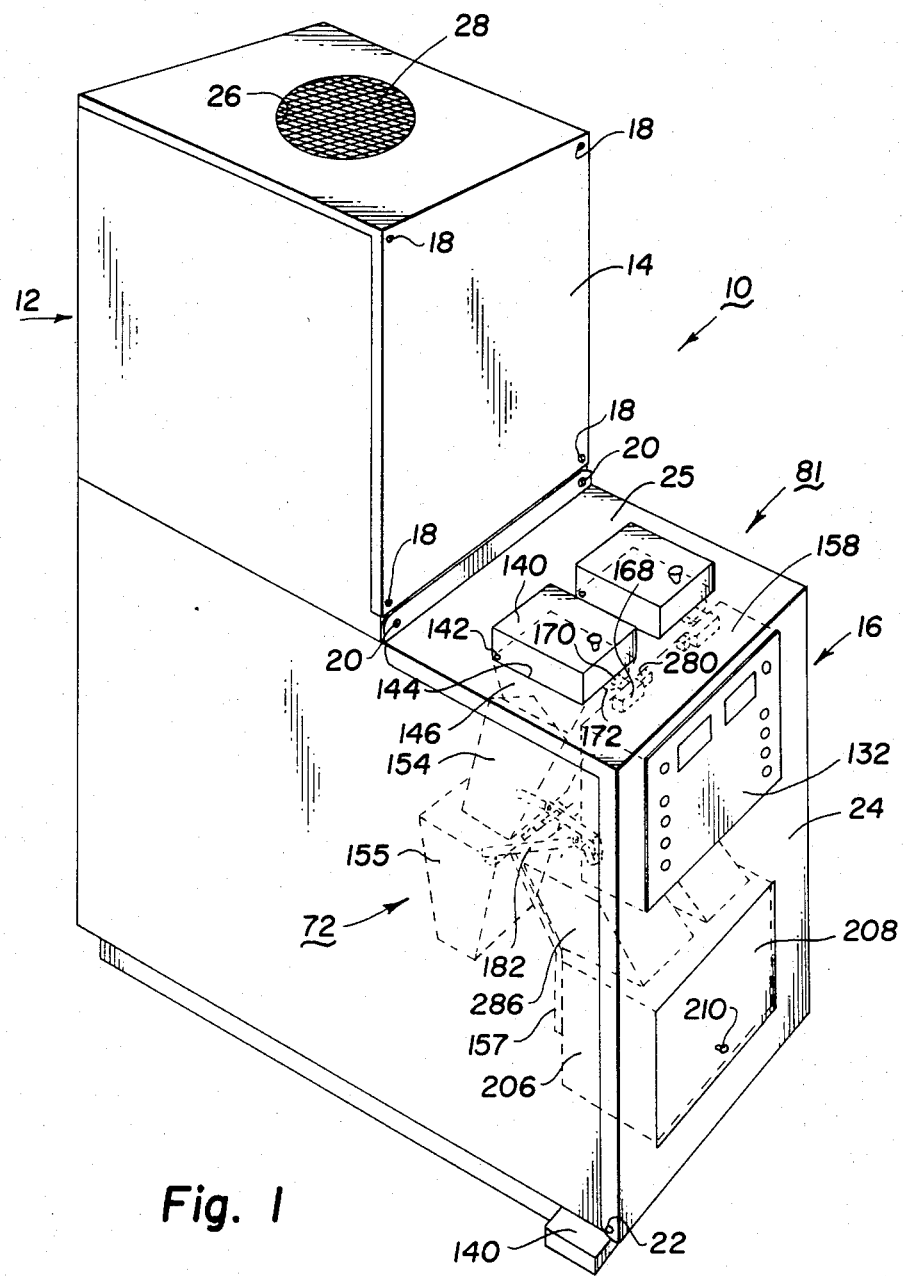
FIG. 1 is a simplified perspective view of the automatic food frying and dispensing apparatus according to the present invention.
Figure 2:
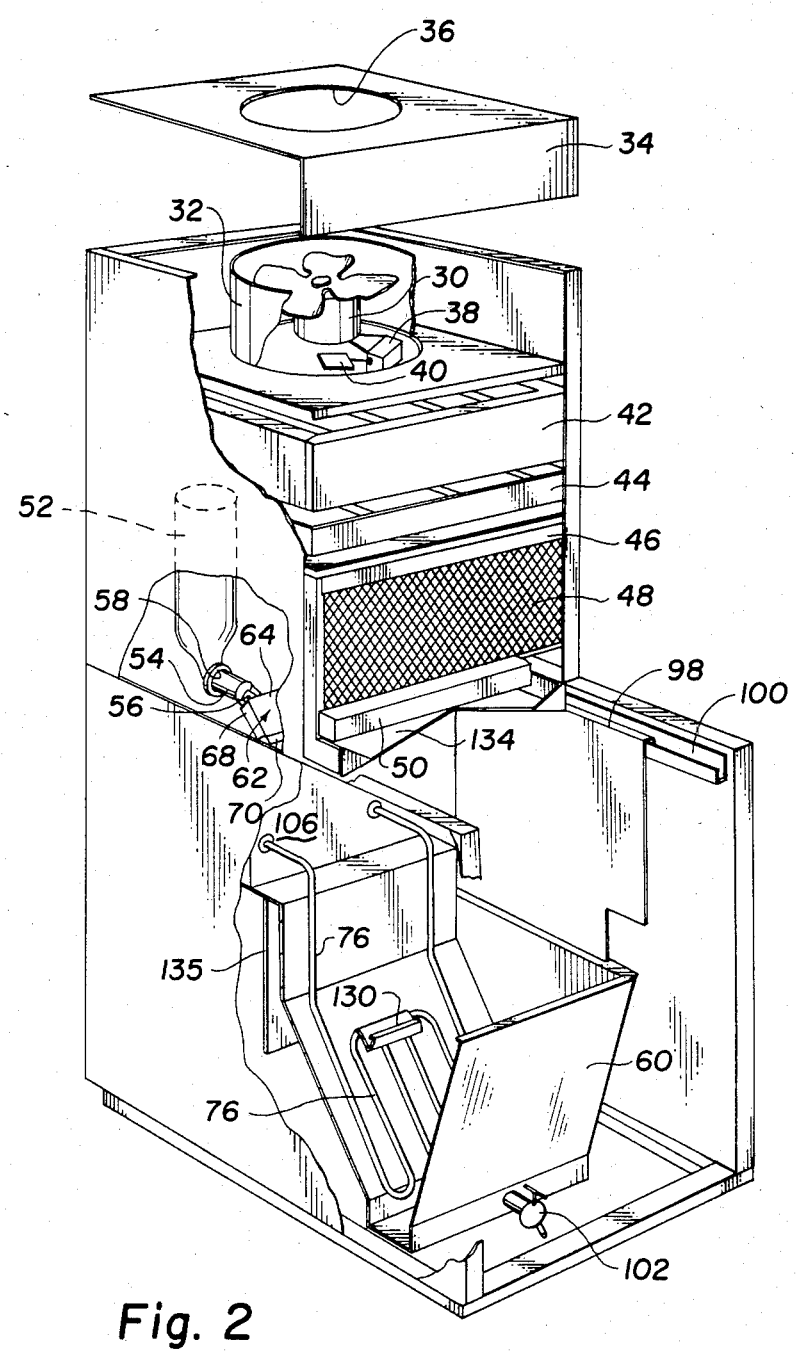
FIG. 2 is a simplified perspective view of the automatic food frying and dispensing apparatus according to the present invention with portions of the cabinet being displaced to expose apparatus to view.

Referring now to the drawing, and in particular to FIGS. 1 and 2, automatic food frying and dispensing apparatus according to the present invention is generally referred to by reference numeral 10. The automatic food frying and dispensing apparatus 10 includes an upright cabinet 12 which is generally L-shaped in side profile. Access to the inside portions of the cabinet 12 is provided through a removable upper cabinet cover 14 and a removable lower cabinet door 16. Upper cabinet cover 14 is removably attached to cabinet 12 by four threaded bolts or screws 18 which include knurled heads of a sufficient size to allow easy attachment and removal by hand without the use of tools. Lower cabinet door 16 is removably attached to cabinet 12 by two bolts or screws 20 at the upper portion of lower cabinet cover 16 and by two bolts or screws 22 (only one being shown) at the lower portion of lower cabinet cover 16. Bolts or screws 20 and 22 also include knurled heads of a sufficient size to allow easy attachment and removal by hand without the use of tools. Bolts or screws 22 are oriented such as to lie in a plane which is substantially parallel to the plane of the front portion 24 such that upon removal of bolts or screws 20, lower cabinet door 16 may be pivoted about bolts or screws 22 and away from cabinet 12 to allow access to the interior of the lower portion of cabinet 12 without the need to completely remove lower cabinet door 16.

The food frying and dispensing apparatus 10 may generally be divided into two areas with the first area being one wherein the air within the cabinet 12 is cleaned and deodorized before it is exhausted through aperture 26, which is covered by grill 28. This air-cleaning area and the apparatus to move and clean the air are located within the upper portion of cabinet 12 behind upper cabinet cover 14 and includes fan assembly 30 which, in the preferred embodiment, is positioned uppermost in cabinet 12. Shield 32, surrounding fan assembly 30, together with baffle 34, tend to direct and concentrate the flow of air through the upper portion of cabinet 12 and to increase the efficiency of fan assembly 30. Aperture 36 in baffle 34 is coaxial with shield 32 and has substantially the same diameter as shield 32. Sail switch 38 with actuating sail 40 is positioned near the lower portion of fan assembly 30 with the actuating sail 40 being positioned in the air stream such that actuating sail 40 will be raised upwardly by the flow of air to actuate or turn "on" sail switch 38. If the air is not flowing, then actuating sail 40 will be in a down position and will turn "off" sail switch 38. Sail switch 38 is in electrical series with heating element 76 and the low voltage power supply such that if the flow of air through the cabinet 12 ceases, then the heating element 76 will be turned off for safety reasons and the low voltage power supply will be inactivated so the automatic food frying and dispensing apparatus 10 cannot be operated by a customer.

Filter module 42 is mounted below and upstream of fan assembly 30. In the preferred embodiment, filter module 42 is slidably mounted within cabinet 12 for easy and quick insertion and removal. Filter module 42 comprises activated charcoal elments or particles packaged in a unique structure which provides a greater area of surface contact with the air flowing through the filter module 42 for a given cross-sectional area of the upper portion of cabinet 12. The structure of filter module 42 will be discussed below. The activated charcoal elements or particles will remove 99% of the oil odors and the cooking odors from the air which exits from the automatic food frying and dispensing apparatus 10.

Flame arrester 44 is mounted below and upstream of filter module 42. In the preferred embodiment, flame arrester 44 is slidably mounted within cabinet 12 for easy and quick insertion and removal. In the event a fire does occurs in the lower portion of cabinet 12, such as an oil fire, flame arrester 44 prevents the flames from passing upwardly into the filter module 42 and catching the filter module 42 on fire and also prevents the flames from passing on to the fan assembly 30 and out aperture 26. The structure of flame arrester 44 will be discussed below.

Precipitator module 46 comprises a two stage penny-type precipitator and is located below and upstream of filter module 42 in cabinet 12 and in the preferred embodiment is slidably mounted therein for easy insertion and removal. The electrical connection to the precipitator module 46 occurs through sliding contacts. The function performed by the precipitator module 46 is extremely important and greatly prolongs the functional life of the filter module 42. The precipitator module 46 removes the particulates from the air which would otherwise appear as smoke or haze as the air exits from cabinet 12. By removing the particulates from the air, the precipitator module 46 eliminates the smoke or haze and by removing the particulates from the air prior to the air passing through the filter module 42, the particulates are prevented from covering the surface area of the activated charcoal elements or particles and thereby preventing operation of the filter module 42 with the resulting requirement to replace the filter module 42. The more efficient the operation of the precipitator module 46, the more efficient the operation of the filter module 42 since the surface area of the activated charcoal elements or particles will remain clean and not clogged with particulates. A basic objective in the design of the automatic food frying and dispensing apparatus 10 was to provide a small compact unit which could be installed on a counter or table top. In designing the precipitator module 46, small size and high efficiency were conflicting requirements. To solve this conflict, the precipitator was designed to be operated in a derated condition. The normal range of face velocity for a two stage penny-type precipitator is 400 to 600 feet per minute. The operating range of face velocity for the inventive precipitator module 46 is 80% or less than that of the normal design value thereby allowing the size of the overall precipitator to be small but yet operate at an efficiency which is much greater than the efficiency with which it would operate if it was operated at the rated condition.

To provide additional safety to the operator or maintenance personnel, a mesh protection guard 48 is provided across the front and bottom of precipitator module 46. Since high DC voltage is applied to precipitator module 46 during the operation thereof, mesh protection guard 48 prevents the operator or maintenance personnel from accidently coming in contact with the high DC voltage applied to precipitator module 46.

Also located in the upper portion of cabinet 12 and positioned below precipitator module 46 is interlock assembly and switch 50 which operates in conjunction with upper cabinet cover 14. Interlock assembly and switch 50 is of the magnetic type and is in electrical series with the primary power (220 volts) into the automatic food frying and dispensing apparatus 10 such that when the upper cabinet cover 14 is removed from cabinet 12, interlock assembly and switch 50 is opened and primary power is removed from the automatic food frying apparatus 10 for safety purposes.

Figure 8:
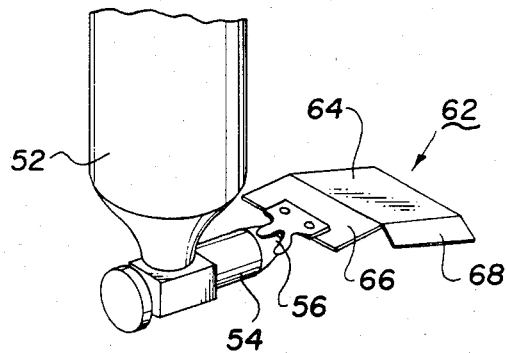
FIG. 8 is a simplified perspective view of the fire extinguisher and deflection shield according to the present invention.
Figure 11:
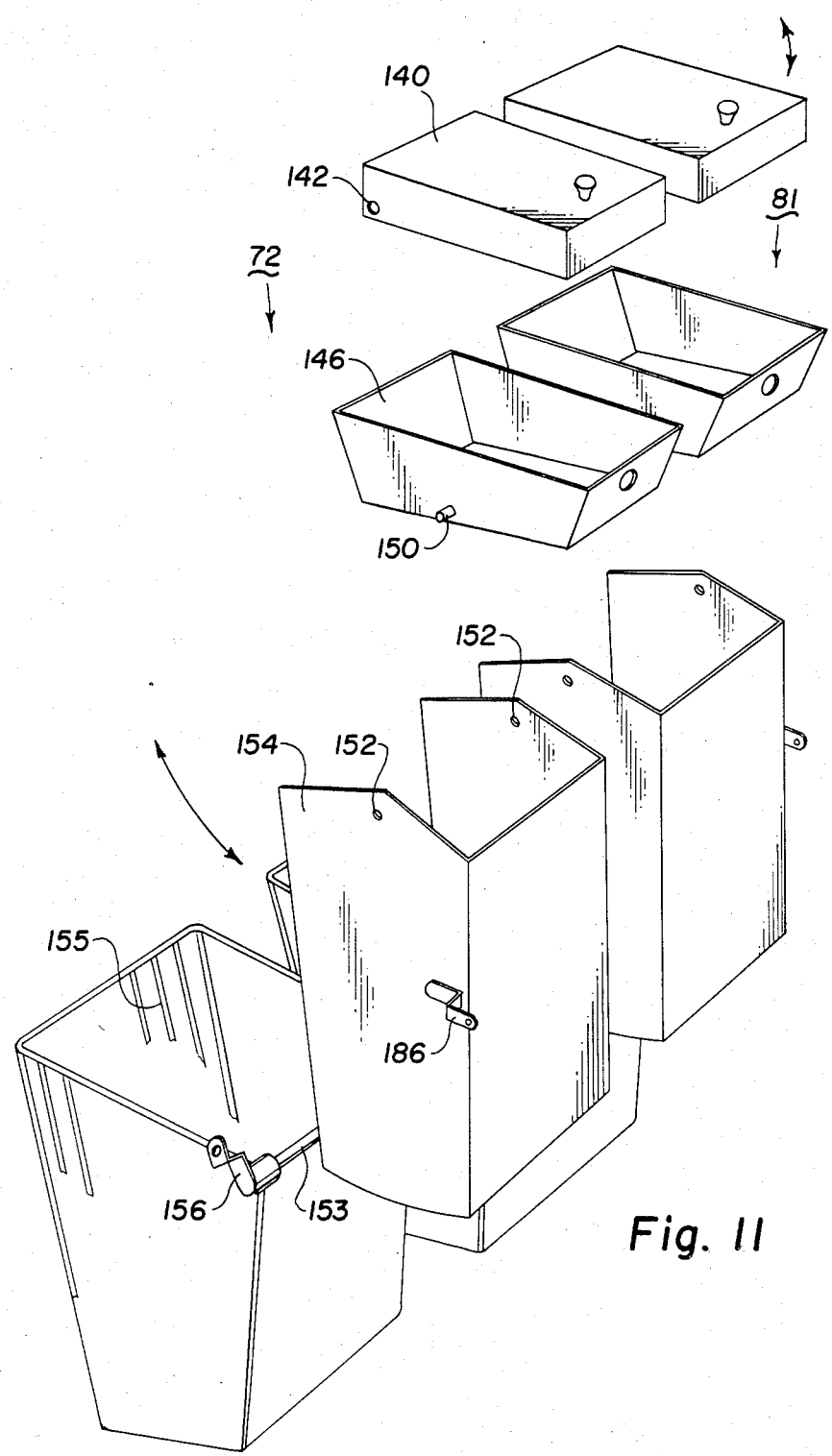
FIG. 11 is a simplified exploded perspective view of a portion of the food handling apparatus according to the present invention.
Figure 12:
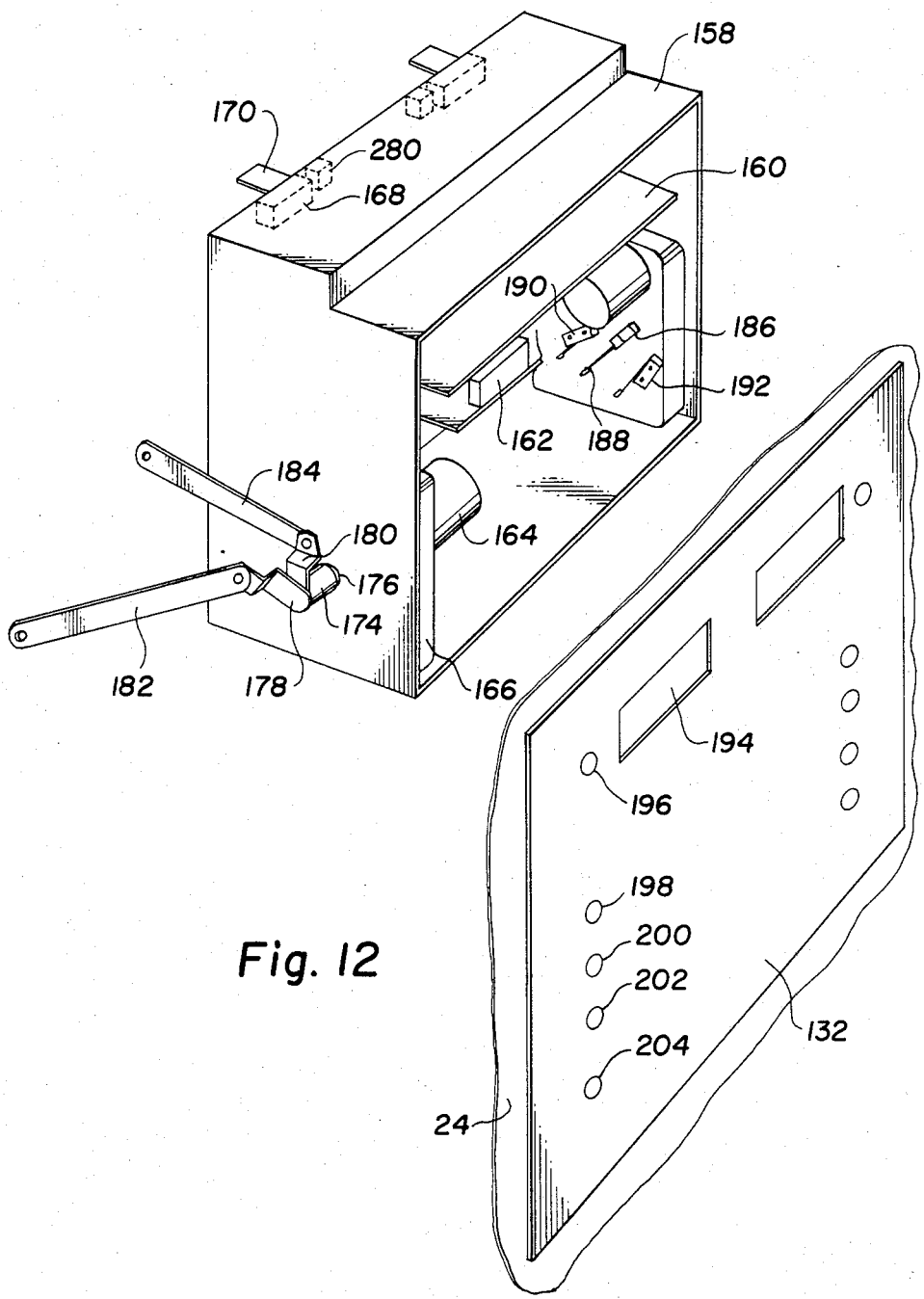
FIG. 12 is a simplified perspective view of the control box and status panel according to the present invention.
Figure 13:
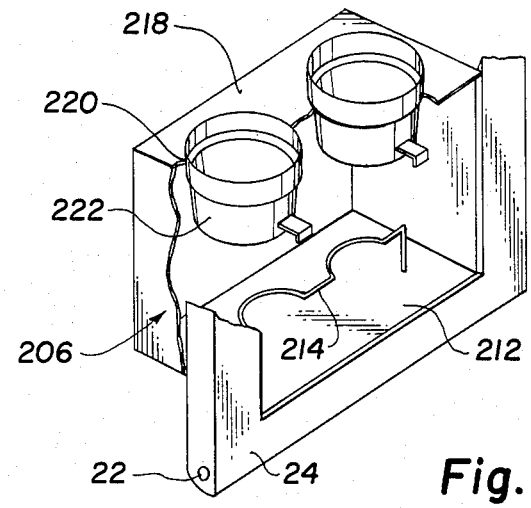
FIG. 13 is a simplified perspective view of the food collection station according to the present invention.
Figure 14:
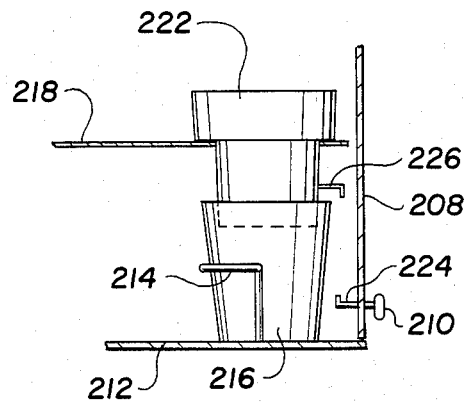
FIG. 14 is a simplified side elevational view of a portion of the food collection station according to the present invention.

Fire extinguisher 52 is attached to the back of the upper portion of cabinet 12 with the nozzle or outlet 54 and sensor 56 being positioned inside cabinet 12 through aperture 58. Means for directing and concentrating the expelled contents of fire extinguisher 52 downwardly onto container 60 is provided in the form of deflection shield 62 attached to nozzle or outlet 54. With reference to FIGS. 2 and 8, deflection shield 62 comprises a main body portion 64 which is generally flat and rectangular in shape and lies generally in a first plane. Formed as an extension of main body portion 64 or attached thereto are four generally rectangular pieces 66–70 (only three of which are shown) which extend from the plane of main body portion 64 at predetermined angles. In the disclosed embodiment, the predetermined angles are approximately 45 degrees. Rectangular piece 66 is attached by conventional means to sensor 56. Fire extinguisher 52 is automatically activated by sensor 56 when a fire is sensed by sensor 56 in cabinet 12. Contacts in sensor 56 are also connected in electrical series with the primary power into the automatic food frying and dispensing apparatus 10 such that primary power (220 volts) in removed from the automatic food frying and dispensing apparatus 10 when sensor 56 senses a fire.

Figure 3:
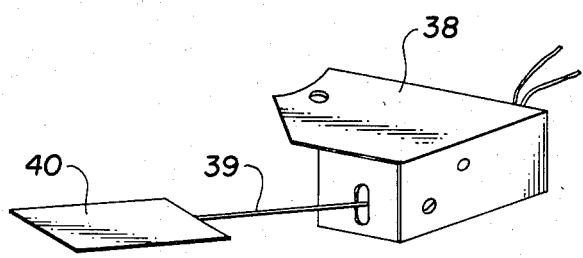
FIG. 3 is a simplified perspective view of the sail switch according to the present inventon.

With reference to FIG. 3, sail switch 38 is disclosed with rod or arm 39 connecting actuating sail 40 to sail switch 38.

Figure 4:
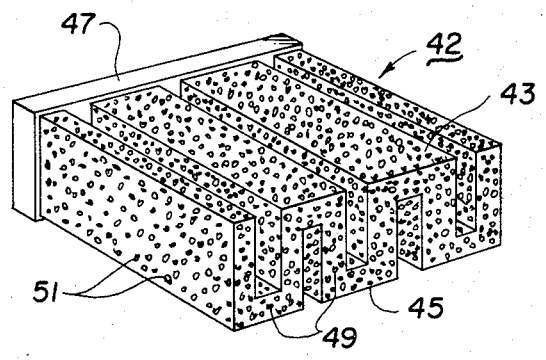
FIG. 4 is a simplified perspective view of the filter module according to the present invention.

With reference to FIG. 4, filter module 42 is disclosed. The structure of the filter module 42 may be considered as comprising an upper cover portion 43, a lower cover portion 45 positioned a predetermined distance from said upper cover portion 43 and two end portions 47 (only one shown) formed to contain and hold the activated charcoal elements or particles 49. Both upper cover portion 43 and lower cover portion 45 include holes or apertues 51 formed therethrough to allow the passage of air therethrough. Both the upper cover portion 43 and the lower cover portion 45 are serpentine-like in shape and as shown in operative position in FIG. 4 form succeeding U-shaped figures which are oriented 180 degrees from each other and share a common leg between succeeding U-shaped figures.

Figure 5:
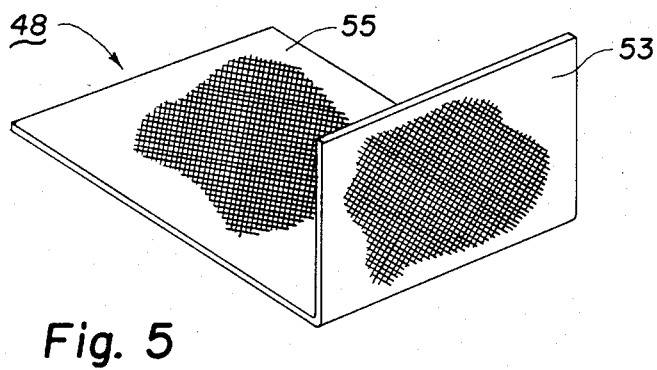
FIG. 5 is a simplified perspective view of the protection guard according to the present invention.

With reference to FIG. 5, mesh protection guard 48 is disclosed and comprises a front portion 53 and a lower portion 55 connected thereto at right angles. When in operative position with respect to the precipitator module 46, mesh protection guard 48 prevents the operator, etc. from physically contacting the front and lower portions of the precipitator module 46. The mesh protection guard 48 may be formed from heavy mesh or screen type material or from a solid material which then has a sufficient number of apertures or openings formed therein to allow a sufficient passage of air therethrough. Front portion 53 and lower portion 55 may be two separate pieces attached to the precipitator module 46 as two separate pieces or may be formed from two separate pieces which are connected together before being attached to the precipitator or the mesh protection guard 48 may be formed from a single piece of material.

Figure 6:
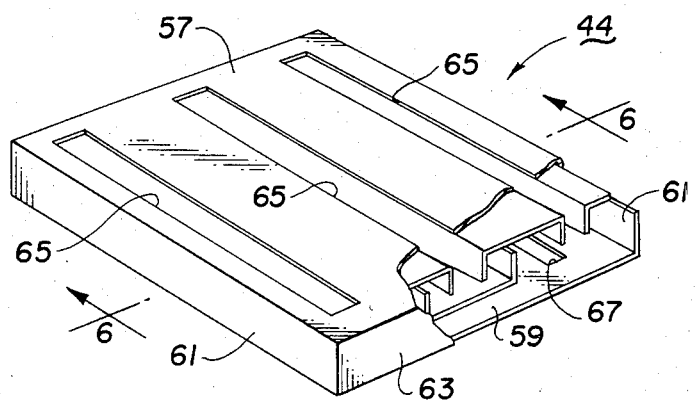
FIG. 6 is a simplified perspective view of the flame arrester according to the present invention.
Figure 7:
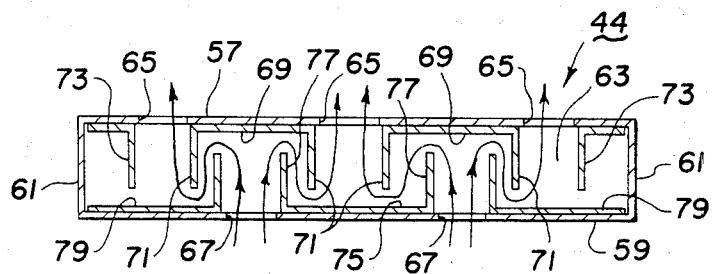
FIG. 7 is a simplified sectional view of the flame arrester according to the present invention as taken along lines 6—6 in FIG. 6.

With reference to FIGS. 6 and 7, flame arrester 44 is disclosed and comprises an upper portion 57, a lower portion 59, two side portions 61 connected between the side edges of the upper portion 57 and the lower portion 59, and two end portions 63 connected between the end edges of the upper portion 57 and the lower portion 59. In the disclosed embodiment, upper portion 57 has three elongated aperture 55 formed therein which are spaced apart a predetermined distance. Lower portion 59 has two elongated apertures 67 formed therein which are spaced apart a predetermined distance and are aligned, with respect to elongated apertures 65, such that each elongated aperture 67 is generally centered between two elongated apertures 65. Attached to the inside surface of upper portion 57 are two U-shaped channel elements 69 with one U-shaped channel element 69 being positioned midway between each two succeeding elongated apertures 65 and centered opposite an elongated aperture 67. The top portions 71 of the U-shaped channel elements 69 are directed toward lower portion 59. Positioned outboard of the elongated apertures 65 are angle irons 73 which are attached to upper portion 57.

Attached to the inside surface of lower portion 59 is a U-shaped channel element 75 which is positioned midway between elongated apertures 67 and opposite elongated aperture 65 (which is positioned in the central area of upper portion 57). The top portions 77 of U-shaped channel element 75 are directed toward upper portion 57. Positioned outboard of each elongated aperture 67 is an angle iron 79 which is attached to lower portion 59. It will be appreciated that flame arrester 44 could include a greater number or a lesser number of apertures and U-shaped channel units without deviating from the disclosed concept. It will be appreciated that flame arrester 44 provides means for preventing or at least greatly reducing the possibility of filter module 42 catching on fire because of a fire located in the lower portion of the cabinet 12. Flames cannot easily and straightforwardly reach filter module 42 since any flames must enter elongated aperture 67, impinge against U-shaped channel elements 69, change direction 90 degrees and impinge against top portions 71, change direction 90 degrees and impinge against angle irons 79 and change direction 180 degrees to exit through elongated apertures 65.

The second general area of the automatic food frying and dispensing apparatus 10 can be considered as the food handling and frying area and is located within the lower portion of cabinet 12 behind cabinet door 16. Within this area is included a container or vat 60 which holds the proper amount of cooking oil 74 (See FIG. 9) for the food frying process. The unique configuration of the container or vat 60 is designed and sized (1) such that with predictable consumer use, the turnover of the cooking oil 74 itself will be such as to not require the cooking oil 74 to be completely drained out and replaced except as would otherwise be dictated by consumer taste and (2) to minimize the amount of cooking oil 74 required to be maintained in the container or vat 60 in order to simultaneously cook or fry successive batches of food product introduced into the cooking oil 74 by the food handling apparatus 72 and 81. By minimizing the amount of cooking oil 74 in container or vat 60, the BTU requirements for the heating element 76 are reduced to a minimum value with a resulting reduction in daily operating costs of the automatic food frying dispensing apparatus 10 since the major item of operating costs is the electricity to heat the cooking oil.

With reference to FIGS. 2 and 9-10, the front wall 78 and rear wall 80 of vat 60 generally form a V in shape with trough 82 formed at the bottom thereof. Front wall 78 forms an angle "a" with the horizontal of 50 to 60 degrees while rear wall 80 forms an angle "b" with the horizontal of 30 to 40 degrees. The shape of front wall 78 and rear wall 80 together with the shape and placement of heater element 76 with respect to rear wall 80 causes the cooking oil 74 to circulate in a counter-clockwise direction generally as shown in FIG. 9 by line "c". The oil 74 sweeps generally up rear wall 80, across the top portion of oil 74, down front wall 78 and across the top of trough 82. The vat 60 is designed to help create convection currents of oil 74 past the heater element 76 and across the top of trough 82 and to reduce the total amount of oil 74 needed and thereby reduce the necessary power consumption to heat the oil 74. Any small bits or pieces of food products gravitate toward trough 82 and fall into dipper 84 which may be lifted out of vat 60 by handle 86 at periodic intervals and the bits or pieces of food products thrown away so they will not contaminate the oil 74 in vat 60. Trough 82 comprises a cold zone in which the temperature of the oil 74 in the cold zone or trough 82 is lower by up to 100 degrees than the temperature of the prime cooking zone above trough 82. The lower temperature in the cold zone avoids accelerated degradation of the oil 74 by not continually cooking the debris held in the cold zone temperature, then accelerated degradation of the oil 74 would occur. Dipper 84 extends across the full width of vat 60. Mark 88 on the handle 86 of dipper 84 provides an indication of the correct oil level for vat 60. At the end of each day of operation of the automatic food frying and dispensing apparatus 10, the operator checks the level of oil 74 in vat 60 relative to mark 90. If insufficient food products have been fried during the day to bring the level of oil 74 down to or below mark 90, then the operator removes sufficient oil 74 to bring the level down to mark 90. Then the operator adds enough fresh oil 74 to bring the level back up to mark 88. Side walls 92 and 94 of vat 60 extend upwardly to near the top of the lower portion of cabinet 12 and include a rolled edge 96 and 98 which are inserted in channels 100 which are attached to cabinet 12 and support vat 60. In other words, vat 60 hangs from and is supported by channels 100. Valve 102 attached to vat 60 allows the oil 74 to be completely drained from vat 60 if and whenever necessary. Handle 104 attached to the front wall 78 of vat 60 provides assistance to the operator in sliding the vat 60 out of cabinet 12 on channels 100 if and whenever necessary.

Heater assembly 106 provides the means for maintaining the temperature of the cooking oil 74 in the proper temperature range and is removably mounted, for pivotal movement, against the back wall of cabinet 12 by mounting means 108. Mounting means 108 include brackets 110 and 112 attached to cabinet 12, pins 114 and 116 projecting from heater assembly 106 and resting in channels 118 and 120 of brackets 110 and 112 respectively. Bracket 122 extends from heater assembly 106 and rests against the upper edge 124 of rear wall 80 for additional support. Flat panel 134 is an extension of upper edge 124 and is generally parallel to the rear wall of cabinet 12 and prevents the wiring (not shown) going to heater assembly 106 from contacting the rear wall 80 of container or vat 60, for safety purposes. Heater assembly 106 includes heater element 76, temperature control assembly 126, over-temperature control assembly 128 and low-oil sensing assembly 130. Temperature control assembly 126 is the temperature control switch and switches the heating element 76 on and off to maintain the temperature of the cooking oil 74 within a predetermined temperature range. Over-temperature control assembly 128 senses when the temperature of the cooking oil 74 reaches a predetermined high value, which is considered too high, and as a safety feature inactivates or breaks the application of primary power to the automatic food frying and dispensing apparatus 10. Assembly 128 provides a safety function by not allowing the cooking oil 74 to be heated above a predetermined temperature, above which the heated cooking oil 74 could more easily cause a fire. Low-oil sensing assembly 130 provides an indication of a low level of cooking oil 74 and is positioned at a predetermined height in vat 60. If the hot oil level falls below the position of assembly 130, then assembly 130 cools below a predetermined value and activates a buzzer to indicate to the operator or proprietor that a problem exists. Also at this time, assembly 130 turns off all lights on status panel 132 (see FIG. 1) and the light (not shown) on the rear of cabinet 12 to indicate to the user or operator that the oil level is low or that the oil temperature is low.

Oil shield 134 is positioned between precipitator module 46 and vat 60 as shown generally in FIG. 10. Edges 136 and 138 are positioned against the side walls of cabinet 12 above channels 100. Oil shield 134 comprises a sheet of metal which extends in depth at least as great as the depth of precipitator module 46 and is to prevent any cooking oil 74, which drips from precipitator module 46, from dropping back into vat 60 and contaminate the oil 74. The oil shield 134 directs any oil droppings over to channels 100 which are sloped such that any oil 74 therein flows to the end of the channels 100 and drips down into the drip tray 140 (see FIG. 1) which rests on the bottom of cabinet 12 and can be slid out of cabinet 12 for cleaning oil drippings therefrom. Drip tray 140 extends the length of cabinet 12 and is slidable mounted on the bottom surface of cabinet 12.

As mentioned previously, lower cabinet cover 16 is pivotable about bolts or screws 22 and includes front portion 24 and top portion 25. With reference to FIGS. 1 and 11-14, separate food handling apparatus 72 and 81 are shown. Food handling apparatus 72 and 81 are separate and operate independently of each other, thereby allowing different customers to cook portions of french fry potatoes at the same time or allow one customer to cook different food items at the same time, such as potatoes and chicken. Food handling apparatus 72 and 81 are both supported from lower cabinet cover 16. Since food handling apparatus 81, as well as any additional food handling apparatus which might be added, is essentially a duplicate of food handling apparatus 72, only food handling apparatus 72 will be discussed in detail to avoid repetition.

Food handling apparatus 72 includes pivotal lid 140 which is attached to top portion 25 by and pivots with respect to pin or rod 142. Pivotal lid 140 covers aperture 144 formed in top portion 25. Attached to top portion 25 by conventional means and positioned coaxial with aperture 144 is first funnel 146. Extending outwardly from the central area of the outside surface of sides 148 of first funnel 146 are pins or rods 150 (only one being shown). Pins or rods 150 protrude through apertures 152 of chute 154 whereby chute 154 is supported by and is pivotable about pins or rods 150. Rod 153 is attached to the top rear edge of cooking basket 155 and includes a first offset crank device 156 attached to the end thereof. Rod 153 is attached to mounting bracket 157 by conventional means which will allow rod 153 to be supported by and rotate with respect to said mounting bracket 157. Mounting bracket 157 is attached to and supported by the rear portion of food collection station or box 206. Second funnel 286 is also attached to and supported by mounting bracket 157.

Control enclosure or box 158 is attached to and is supported by front portion 24 and includes status panel 132 attached to the front portion thereof. Control enclosure or box 158 includes printed circuit board 160 (which contains the control electronics), printed circuit board 162 (which contains the DC power supply), DC drive motor 164 and gear box 166. Solenoid device 168 is mounted near the upper portion of control enclosure or box 158 in operative position with respect to pivotal lid 140 such that movable latch 170 may operatively cooperative with loop 172 on pivotal lid 140 such that when movable latch 170 is extended to protrude through loop 172 of pivotal lid 140 then pivotal lid 140 is locked in the down or closed position. When movable latch 170 is in the retracted position, then pivotal lid 140 may be raised or opened. Shaft 174 protrudes from gear box 166 through aperture 176 in the side of control enclosure or box 158 and has a second offset crank device 178 and a third offset crank device 180 attached to the end thereof. A first actuating link or lever 182 is attached between the second offset crank device 178 on shaft 174 and the first offset crank device 156 attached to rod 153 on cooking basket 155. A second actuating link or lever 184 is attached between the third offset crank device 180 on shaft 174 and the offset lever 186 attached to chute 154. Gear box 166 includes shaft 186 with arm 188 attached thereto. Up limit-switch 190 and down limit switch 192 are attached to the outside of gear box 166 and are positioned such as to be capable of being operatively contacted by arm 188.

Status panel 132 includes an LED or LCD display 194 to display time in a decreasing direction and a green LED 196 to indicate that cooking basket 155 is in the up position and the automatic food frying and dispensing apparatus 10 is ready to be used. Four switches 198-204 are used by the customer/operator to select a cooking time. The four switches 198-204 may be adjusted at the factory to select any time between five seconds up to 195 seconds in increments of five seconds. Typical selection times might be 60 seconds for switch 198, 90 seconds for switch 200, 120 seconds for switch 202 and 150 seconds for switch 204.

Food collection station or box 206 is attached to and supported by front portion 24 and includes a front door 208 which is mounted for sliding movement in the up and down directions. Knob or handle 210 provides an easy means for the customer to grasp and slide the front door 208. Inside the food collection station or box 206 and supported by floor 212 is wire support 214 for providing support to cup or containers 216 into which the cooked food is deposited. In the top 218 of food collection station or box 206 is located aperture 220 into which third funnel 222 is operatively positioned for slidable movement therewithin. With the front door 208 in the down position, the lower portion of third funnel 222 rests down inside the top portion of cup or container 216 to prevent food from being deposited outside the cup or container 216. When the front door 208 is raised by the customer to retrieve the cup or container 216 containing the cooked food, latch 224 (which is attached to the inside surface of front door 208) contacts bar 226 on third funnel 222 and slides third funnel 222 upwardly in aperture 220 so that cup or container 216 may be easily removed from the food collection or box 206.

Figure 15:
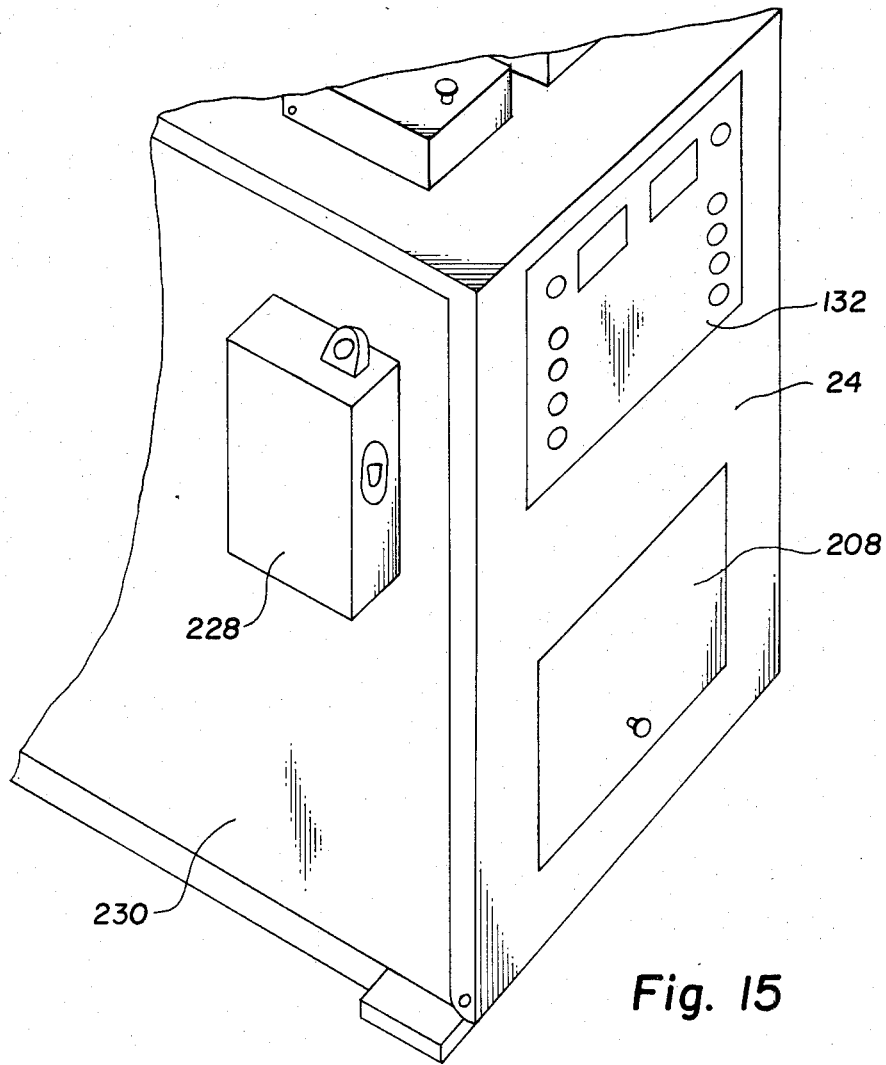
FIG. 15 is a simplified perspective view of an alternate embodiment of the automatic food frying and dispensing apparatus according to the present invention.

With reference to FIG. 15, one embodiment of the automatic food frying and dispensing apparatus 10 includes a coin changer and switch 228 attached to side panel 230 of cabinet 12. Coin changer and switch 228 are electrically connected to printed circuit board 160 to control the activation of the automatic food frying and dispensing apparatus 10.

Figure 16:
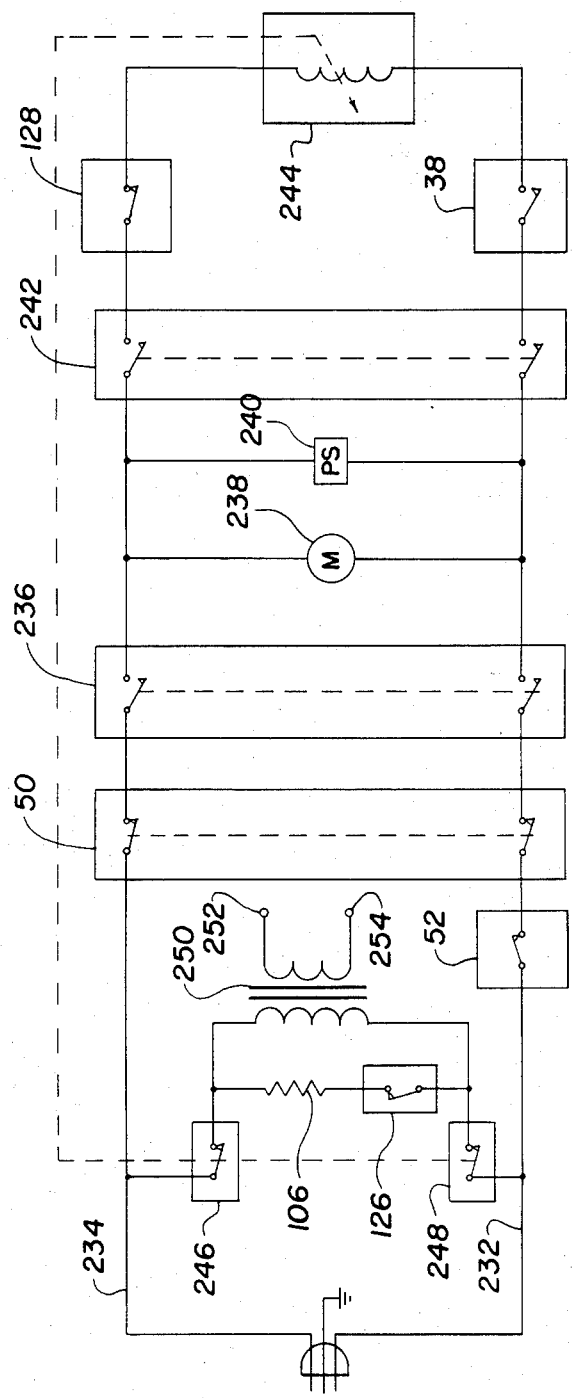
FIG. 16 is a simplified schematic diagram of the primary power system of the automatic food frying and dispensing apparatus according to the present invention.

With reference to FIG. 16, the primary power for the automatic food frying and dispensing apparatus 10 is disclosed. Primary power of 220 volts is introduced on line 232 and 234 to switch in fire extinguisher 52 then to interlock assembly and switch 50, then to the main power switch 236 (on the back of cabinet 12), then to motor 238 in fan assembly 30, then to the high voltage power supply 240 for precipitator module 46, then to switch 242 for heater assembly 106, then to over-temperature control assembly 128, then to relay 244 and finally to sail switch 38. The energizing of relay 244 closes switches 246 and 248 to energize heater assembly 106 through temperature control assembly 126 and to also apply primary power to transformer 250 resulting in approximately 19 volts AC being available at terminals 252 and 254.

Figure 17:
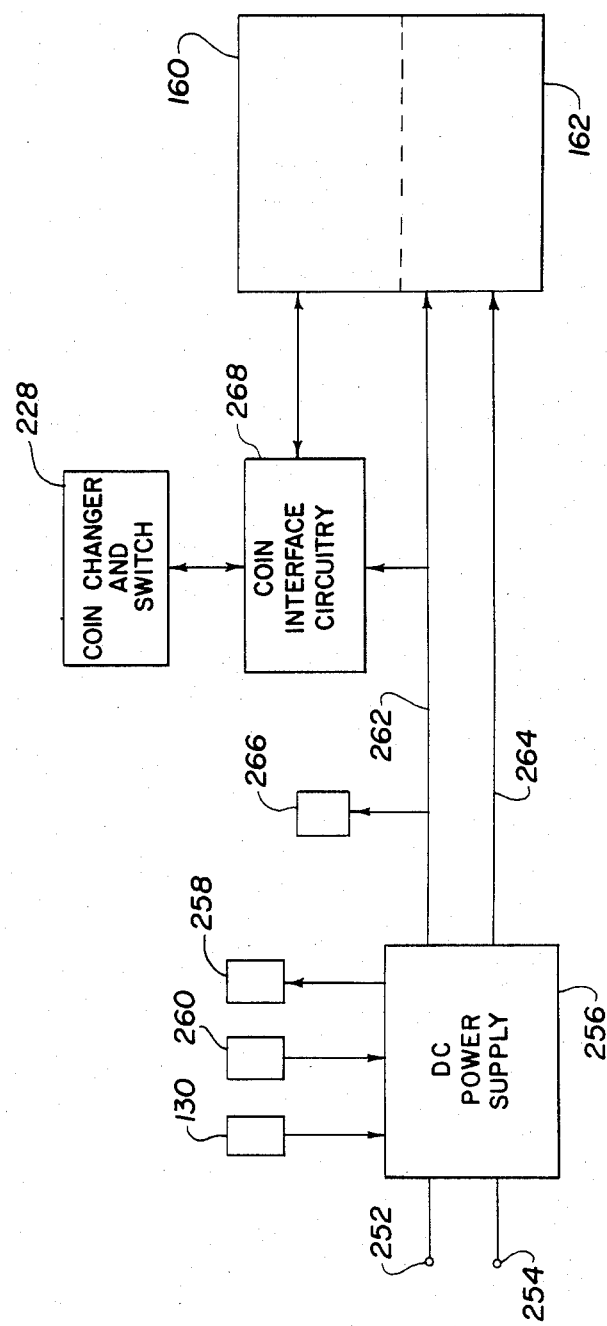
FIG. 17 is a simplified schematic diagram of the secondary power system of the automatic food frying and dispensing apparatus according to the present invention.

With reference to FIG. 17, the secondary power system for the automatic food frying and dispensing apparatus 10 is disclosed. Approximately 19 volts AC from terminals 252 and 254 is applied to DC power supply 256 whose presence or absence of an output is controlled by low oil sensing assembly 130. When primary power is first applied to the automatic food frying and dispensing apparatus 10, the switch means in low oil sensing assembly 130 remains open, because the cooking oil 74 is not up to operating temperature, and the beeper 258 provides an audible sound to notify the operator that the apparatus is not ready to operate and cook food at the present time. A beeper defeat switch 260 allows the operator to turn off the beeper 258 if the sound from the beeper 258 becomes annoying. When the temperature of the cooking oil 74 arrives at the desired operating temperature, the low oil sensing assembly 130 causes the beeper to be shut off and causes the DC power supply 256 to output a regulated 13 volts DC on line 262 and approximately 19 volts AC on line 264. The voltage on line 262 causes light 266, located on the back of cabinet 12, to come "on". Power is then applied to the coin interface circuitry 268, coin changer and switch 228 and printed circuit boards 160 and 162.

Figure 18:
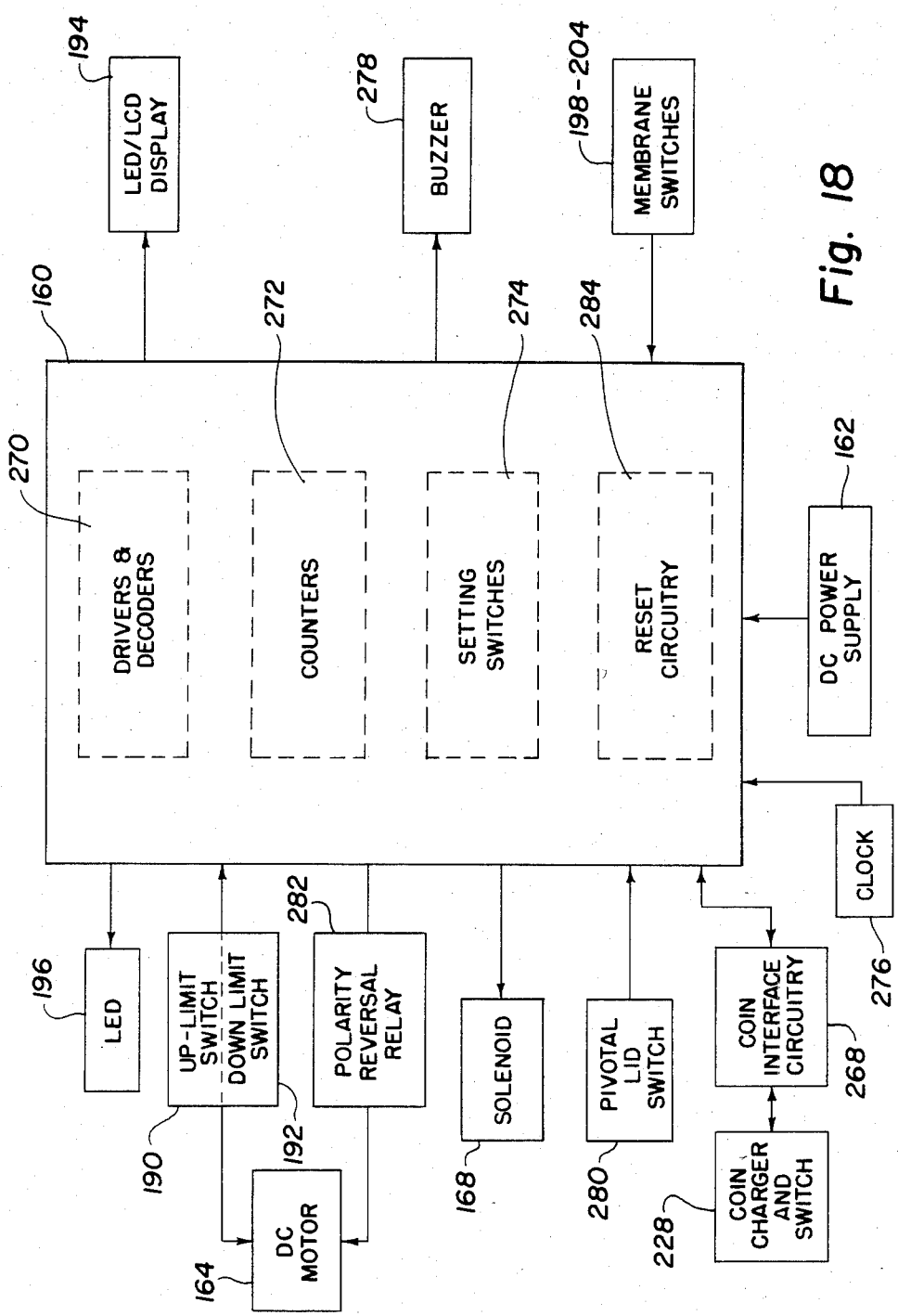
FIG. 18 is a simplified schematic of the circuitry to activate and control the dispensing of the food products of the automatic food frying and dispensing apparatus according to the present invention.

With reference to FIG. 18, the electronic circuitry to activate and control the dispensing of the food products is disclosed for food handling apparatus 72. Similar circuitry is provided for food handling apparatus 81 with some circuits and elements being shared by both food handling apparatus 72 and 81. Printed circuit board 160 contains the majority of the electronic circuitry and cab be divided into primary areas of drivers and decoders 270, counters 272, setting switches 274 and reset circuitry 284 which are operatively interconnected on printed circuit board 160. Setting switches 274 are switched to predetermined positions to provide predetermined set times which will be selected by activation of each individual membrane switch 198-204. The DC power supply on printed circuit board 162, clock 276, coin changer and switch 228, coin interface circuitry 268 and buzzer 278 are common to and shared by both food handling apparatus 72 and 81.

In operation and with reference to FIGS. 1 and 11-18, a typical day of use of the automatic food frying apparatus 10 begins with the main power switch 236 being placed in the "on" position which applies power to and activates the fan assembly 30 and the high voltage power supply 240 for precipitator module 46 (see FIG. 16). Switch 242 for heater assembly 106 is then placed in the "on" position causing relay 244 to be energized and apply power to heater assembly 106 and transformer 250 whose output is applied to DC power supply 256 (see FIG. 17). Since the cooking oil 74 is not up to operating temperature, the low oil sensing assembly 130 causes beeper 258 to be activated. When cooking oil 74 reaches operating temperature, beeper 258 will shut off and light 266 (on the back of cabinet 12) will be turned "on" indicating that apparatus 10 is "ready". Also, the voltage will be applied to lines 262 and 264 to activate the electronic circuitry of FIG. 18 and the green LED 196 will be turned "on" on status panel 132 to indicate to a customer that the food handling apparatus 72 of apparatus 10 is ready for use with the cooking basket 155 being in the "up" position and out of the oil.

For the non-coin operated apparatus, the customer may now take a container of frozen food to the machine, determine the length of cooking time required for that particular type and amount of food and press the particular membrane switch 198-204 which will provide that length of cooking time. When one of the membrane switches 198-204 is pressed, solenoid 168 is energized to the unlock position, so the customer may now pivot pivotal lid 140 to the open position, and polarity reversal relay 282 causes DC motor 164 to be energized and the particular cooking time which was chosen is displayed on the LED/LCD display 194. DC motor 164 drives the gears in gear box 166 which in turn rotates shaft 174 counterclockwise (see FIG. 12) causing first actuating link or lever 182 to rotate rod 153 causing cooking basket 155 to be lowered into the cooking oil 74 in container 60 until down-limit switch 192 is contacted by arm 188 and turns off DC motor 164. The rotation of shaft 174 together with second actuating link or lever 184 causes chute 154 to pivot rearwardly (see FIG. 1) such that its lower end is positioned over cooking basket 155. Green LED 196 will be turned off and the green LED for food handling apparatus 81 will be turned "on" indicating that food handling apparatus 81 is now ready to be used. The customer then raises pivotal lid 140 and deposits the food into aperture 144 whereupon the food is guided by chute 154 into cooking basket 155. The customer closes pivotal lid 140 whereupon a signal from pivotal lid switch 280 causes the solenoid 168 to be released and locking pivotal lid 140 in the closed position and starts counter 272 counting down from the chosen time to zero which causes the time in seconds displayed on the LED/LCD display 194 to be counted down to zero. When the counter 272 and the LED/LCD display 194 reach zero, polarity reversal relay 282 causes a reversed polarity DC signal to be applied to DC motor 164 which causes DC motor 164 to rotate in the reverse direction and raise the cooking basket 155 out of the cooking oil 74. Chute 154 is pivoted out of the way of the cooking basket 155 such that the cooking basket 155 may rotate to the "dump" position and discharge the cooked food into second funnel 286 which guides the cooked food into third funnel 222 which deposits or guides the cooked food into cup or container 216 which was placed into position under third funnel 222 by the customer after the customer had deposited the frozen food therefrom into aperture 144. Up limit-switch 190 is contacted by arm 188 and turns off DC motor 164 when cooking basket 155 has been rotated to the "dump" or "up" position. Buzzer 278 is activated for a predetermined amount of time. The customer will then raise front door 208 which raises third funnel 222 upwardly so the customer may remove cup or container 216 which now holds the cooked food. Green LED 196 for food handling apparatus 72 will remain "off" since the green LED for food handling apparatus 81 is "on". If food handling apparatus 81 is being used at the time food handling apparatus 72 completes its cycle, then green LED 196 will be turned "on" indicating that food handling apparatus 72 is ready to be used. Food handling apparatus 72 and 81 alternate in usage.

If after a customer presses one of membrane switches 198-204, the customer does not open and close pivotal lid 140, then after 30 seconds reset circuitry 284 is activated and DC motor 164 is activated to drive the cooking basket 155 to the "up" or "dump" position and the LED/LCD display 194 will be reset to zero.

For the coin operated apparatus, of course the coin changer and switch 228 together with the coin interface circuitry 268 are added to the apparatus 10. Until the correct amount of money has been accepted by the coin changer and switch 228, green LED 196 is "off" the membrane switches 198-204 are not active and pressing any or all membrane switches does not affect the apparatus 10 and the pivotal lid 140 can not be opened. Upon acceptance of the correct amount of money, green LED 196 is turned "on" and membrane switches 198-204 are activated. If both food handling apparatus 72 and 81 are in use, coin changer and switch 228 will not accept money.

During operation of the automatic food frying and dispensing apparatus 10, fan assembly 30 is drawing air into the cabinet 12 through the front of cabinet 12 where drip tray 140 enters cabinet 12. The air is drawn around and across vat 60 (where smoke and fumes from the hot cooking oil 74 are drawn into the air stream), up through the precipitator module 46 where the particulates are removed, up through the flame arrester 44 and up through the filter module 42 where odors are removed from the air which is then discharged out aperture 26.

In the performance of daily maintenance, screws 20, which hold the lower cabinet door 16, are removed and door 16 is pivoted downwardly. The level of the oil 74 in vat 60 is checked using the marks 88 and 90 and oil 74 is removed, if necessary, to bring the oil level down to mark 90. New oil 74 is added to bring the oil level up to mark 88. During this time, the fan assembly 30 together with the other units behind upper cabinet cover 14, are operating to process the smoke and fumes associated with the hot oil 74 in vat 60 so the smoke and fumes will not escape into the room.

All materials used in the construction of the automatic food frying and dispensing apparatus 10 is of such a nature and composition as to be non-toxic to the food product handled and to be compatible with continued contact with the food products where applicable.

It will be appreciated that the invention provides apparatus for quickly cooking a food product in a short period of time which can be operated easily and safely by a user. Various means are provided for effectively eliminating any discharge of smoke or odor from the apparatus during its operation. The design of the container for the cooking oil together with the operation of the apparatus assures a minimum contamination of the cooking oil which results in a maximum usable life of the cooking oil. Means are provided to assure that the oil remains internal to the apparatus.

Thus, it is apparent that there has been provided in accordance with this invention, an automatic food frying and dispensing apparatus that substantially incorporates the advantages set forth above. Although the present invention has been described in conjunction with specific forms thereof, it is evident that many alternatives, modifications, and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc. may be made without departing from the spirit and scope of the invention as defined in the appended claims.

We claim:

1. Automatic food frying and dispensing apparatus, said apparatus comprising:
   a cabinet adapted to be supported at a suitable working height and having a predetermined number of panels, at least one of said panels being configured to allow access to the interior of said cabinet;
   a container positioned within said cabinet for holding a supply of cooking oil;
   means for maintaining the temperature of said cooking oil sufficiently high for cooking successive batches of food products;
   means positioned within the cabinet for supporting the food product;
   means for an operator to manually select a length of time for the food product to be cooked;
   means for allowing the food product to be manually deposited by said operator into said means for supporting, said means for allowing including a lid which is movably mounted to a predetermined one of said panels of said cabinet with said lid being movable between a closed position and an open position, an aperture formed in said one of said panels and positioned in operative alignment with said lid and a chute which is operatively positioned in said cabinet to guide the food product from said aperture to said means for supporting;
   means for automatically lowering the means for supporting the food product into the supply of cooking oil to a cook position upon the manual selection of the length of time for the food product to be cooked;
   means for determining the termination of the selected length of time for the food product to be cooked;
   means for automatically raising the means for supporting the food product to a discharge position upon the termination of the length of time manually selected by said operator for the food product to be cooked;
   a food collection station positioned in a predetermined portion of said cabinet and capable of supporting a food container placed therein by said operator; and
   means for guiding the food product from the means for supporting to said food container positioned in said food collection station by said operator.

2. The apparatus of claim 1 further including means for displaying the length of time chosen by the operator for the food product to be cooked.

3. The apparatus of claim 1 further including means for locking said lid in a closed position covering said aperture and maintaining said lid in said locked and closed position until said operator selects a length of time for the food product to be cooked.

4. The apparatus of claim 3 further including means for unlocking said lid from said locked position so said lid may be manually opened by said operator, said means for unlocking being capable of being actuated by the activation of said means for manually selecting a length of time for the food product to be cooked.

5. The apparatus of claim 1 further including means for sensing that said lid is in a closed position.

6. The apparatus of claim 1 further including means for indicating to said operator that said automatic food frying and dispensing apparatus is ready for use by said operator.

7. The apparatus of claim 1 further including a coin changer and switch means for controlling the activation of said automatic food frying and dispensing apparatus.

8. The apparatus of claim 1 further including means for signaling said operator that said food product has been cooked and has been discharged into said food container.

9. The apparatus of claim 1 further including a first funnel operatively positioned between said aperture and said chute for further guiding said food product.

10. The apparatus of claim 1 wherein said means for manually selecting a length of time for the food product to be cooked comprises a predetermined number of switches.

11. The apparatus of claim 1 wherein said chute is pivotally mounted within said cabinet.

12. The apparatus of claim 1 wherein said means for guiding the food product includes a second funnel operatively positioned to receive said food product from said means for supporting and a third funnel operatively positioned to receive said food product from said second funnel, said third funnel being supported for up and down movement in said food collection station, wherein a lower portion of said third funnel is positioned in the opening of said food container when said third funnel is in the down position and the lower portion of said third funnel is positioned out of the opening of the food container when said third funnel is in the up position.

13. The apparatus of claim 12 wherein said food collection station further includes a door which is mounted for up and down movement to allow said operator to place a food container therein and to remove the food container after the food product has been discharged into said food container, said door including means to engage said third funnel whereby said third funnel is moved to an up position when said door is raised to an up position and said third funnel is moved to a down position when said door is lowered to a down position.

14. The apparatus of claim 1 wherein said means for automatically lowering the means for supporting the food product further comprises:
 means for rotatably supporting said means for supporting;
 a rotatable shaft;
 a first actuating lever operatively connected between said means for rotatably supporting and said rotatable shaft;
 a reversible motor; and
 gearing means operatively connected between said reversible motor and said rotatable shaft.

15. The apparatus of claim 14 further including energizing means capable of being applied to said reversible motor and means for controlling the length of time of application and the polarity of the energized means applied to said reversible motor.

16. Automatic food frying and dispensing apparatus, said apparatus comprising:
 a cabinet adapted to be supported at a suitable working height and having a predetermined number of panels, at least one of said panels being configured to allow access to the interior of said cabinet;
 a container positioned within said cabinet for holding a supply of cooking oil;
 means for maintaining the temperature of said cooking oil sufficiently high for cooking successive batches of food products;
 means positioned within the cabinet for supporting the food product;
 means for an operator to manually select a length of time for the food product to be cooked;
 means for allowing the food product to be manually deposited by said operator into said means for supporting;
 means for automatically lowering the means for supporting the food product into the supply of cooking oil to a cook position upon the manual selection of the length of time for the food product to be cooked;
 means for determining the termination of the selected length of time for the food product to be cooked;
 means for automatically raising the means for supporting the food product to a discharge position upon the termination of the length of time manually selected by the operator for the food product to be cooked;
 blower means positioned within said cabinet for circulating air through the automatic food frying and dispensing apparatus along a predetermined path and exiting at a predetermined location; and
 a flame arrester positioned in said predetermined air path and downstream from said container for holding a supply of oil, said flame arrester configured to prevent flames from traveling past said flame arrester toward said blower means.

17. The apparatus of claim 16 wherein said flame arrester comprises:
 an upper portion lying generally in a first plane and including a predetermined number of apertures formed therein, said upper portion further including projections extending from a first side thereof with a projection being positioned on each side of each aperture;
 a lower portion lying generally in a second plane, said second plane being generally parallel to said first plane, said lower portion including a predetermined number of apertures formed therein, said lower portion further including projections extending from a first side thereof with a projection being positioned on each side of each aperture, said first side of said lower portion facing said first side of said upper portion; and
 side portions operatively connected between said upper portion and said lower portion, around the periphery thereof.

18. Automatic food frying and dispensing apparatus, said apparatus comprising:
 a cabinet adapted to be supported at a suitable working height and having a predetermined number of panels, at least one of said panels being configured to allow access to the interior of said cabinet;
 a container positioned within said cabinet for holding a supply of cooking oil;
 means for maintaining the temperature of said cooking oil sufficiently high for cooking successive batches of food products;
 means positioned within the cabinet for supporting the food product;
 means for an operator to manually select a length of time for the product to be cooked;

means for allowing the product to be manually deposited by said operator into said means for supporting;

means for automatically lowering the means for supporting the food product into the supply of cooking oil to a cook position upon the manual selection of the length of time for the food product to be cooked;

means for determining the termination of the selected length of time for the food product to be cooked;

means for automatically raising the means for supporting the food product to a discharge position upon the termination of the length of time manually selected by the operator for the food product to be cooked;

blower means positioned within said cabinet for circulating air through the automatic food frying and dispensing apparatus along a predetermined path and exiting at a predetermined location; and switch means physically positioned in the predetermined path of circulating air and capable of being operated to an "on" condition by the circulating air, said switch means being operatively coupled with respect to said means for maintaining the temperature of said cooking oil such that said means for maintaining the temperature of said cooking oil will not function unless said switch means is in the "on" condition.

19. Automatic food frying and dispensing apparatus, said apparatus comprising:

a cabinet adapted to be supported at a suitable working height and having a predetermined number of panels, at least one of said panels being configured to allow access to the interior of said cabinet;

a container positioned within said cabinet for holding a supply of cooking oil;

means for maintaining the temperature of said cooking oil sufficiently high for cooking successive batches of food products;

means positioned within the cabinet for supporting the food product;

means for an operator to manually select a length of time for the food product to be cooked;

means for allowing the food product to be manually deposited by said operator into said means for supporting;

means for automatically lowering the means for supporting the food product into the supply of cooking oil to a cook position upon the manual selection of the length of time for the food product to be cooked;

means for determining the termination of the selected length of time for the food product to be cooked;

means for automatically raising the means for supporting the food product to a discharge position upon the termination of the length of time manually selected by the operator for the food product to be cooked;

blower means positioned within said cabinet for circulating air through the automatic food frying and dispensing apparatus along a predetermined path and exiting at a predetermined location; and a charcoal filter positioned in said predetermined air path, said charcoal filter comprising an upper portion of serpentine shape forming a succession of hills and valleys, a lower portion of serpentine shape forming a succession of hills and valleys, said lower portion being positioned in mating relationship with said upper portion and a predetermined distance therefrom, side portions operatively connected between said upper portion and said lower portion, around the periphery thereof, to form a volume therewithin, and charcoal particles contained within said volume.

20. The apparatus of claim 19 wherein the hills of said upper portion are greater in width than the valleys of said upper portion and the valleys of said lower portion are greater in width than the hills of said lower portion.

* * * * *